(12) United States Patent
Arellano

(10) Patent No.: US 9,022,420 B1
(45) Date of Patent: May 5, 2015

(54) ADDED OVERLAP OF AN AIRBAG FOR PREVENTING BUCKLING OF THE AIRBAG DURING AN IMPACT

(71) Applicant: Toyota Motor Engineering & Manufacturing North America, Inc., Erlanger, KY (US)

(72) Inventor: Nora Arellano, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/263,651

(22) Filed: Apr. 28, 2014

(51) Int. Cl.
*B60R 21/16* (2006.01)
*B60R 21/231* (2011.01)
*B60R 21/232* (2011.01)
*B60R 21/00* (2006.01)

(52) U.S. Cl.
CPC ......... *B60R 21/232* (2013.01); *B60R 21/23138* (2013.01); *B60R 2021/0006* (2013.01); *B60R 2021/0048* (2013.01)

(58) Field of Classification Search
USPC ............................................ 280/730.2, 728.2
See application file for complete search history.

(56) References Cited

U.S. PATENT DOCUMENTS

| | | | |
|---|---|---|---|
| 5,333,899 A * | 8/1994 | Witte | 280/730.2 |
| 6,260,878 B1 | 7/2001 | Tanase | |
| 6,338,498 B1 * | 1/2002 | Niederman et al. | 280/728.2 |
| 6,371,512 B1 | 4/2002 | Asano et al. | |
| 6,481,743 B1 * | 11/2002 | Tobe et al. | 280/728.2 |
| 6,974,151 B2 | 12/2005 | Ochiai et al. | |
| 7,322,601 B2 * | 1/2008 | Bertossi | 280/730.2 |
| 7,445,233 B2 * | 11/2008 | McKimson | 280/730.2 |
| 7,798,520 B2 | 9/2010 | Feller et al. | |
| 7,828,321 B2 | 11/2010 | Bakhsh et al. | |
| 8,141,899 B2 | 3/2012 | Arima et al. | |
| 8,579,322 B2 * | 11/2013 | Saimura et al. | 280/729 |
| 8,770,618 B2 * | 7/2014 | Fukawatase et al. | 280/730.2 |
| 2005/0189743 A1 | 9/2005 | Bakhsh et al. | |
| 2012/0139215 A1 | 6/2012 | Heuschmid et al. | |
| 2012/0235390 A1 | 9/2012 | Kraft et al. | |
| 2012/0256401 A1 | 10/2012 | Kato et al. | |

OTHER PUBLICATIONS

U.S. Appl. No. 13/921,820, filed Jun. 19, 2013, Arellano.

* cited by examiner

*Primary Examiner* — Faye M. Fleming
(74) *Attorney, Agent, or Firm* — Oblon, McClelland, Maier & Neustadt, L.L.P.

(57) ABSTRACT

An curtain side airbag apparatus includes an airbag and an inflator. The airbag is stored in a housing adjacent to a side structure of a vehicle. The airbag includes a main body and an additional cushion portion. The housing includes an opening flange. The inflator provides a gas into the airbag for inflating the airbag. Upon deployment of the airbag, the main body of the airbag projects substantially downwardly from the housing and the additional cushion portion of the airbag projects substantially upwardly into the opening flange of the housing.

12 Claims, 7 Drawing Sheets

US 9,022,420 B1

ADDED OVERLAP OF AN AIRBAG FOR PREVENTING BUCKLING OF THE AIRBAG DURING AN IMPACT

FIELD OF THE DISCLOSURE

The present disclosure generally relates to an airbag apparatus. More specifically, the present disclosure relates to an added overlap of a side curtain airbag for preventing buckling of the airbag during an impact.

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

As vehicular machines such as an automobile increase in number, more attention is drawn to the safety of the riders. In particular, the importance of side curtain airbag devices during a vehicle crash or rollover is widely recognized. A side curtain airbag typically extends along a side structure of a vehicle body and is fixedly attached to the vehicle body via multiple attachments. During a vehicle crash, part of an occupant's body, for example the occupant's head may impact the side curtain airbag.

SUMMARY

In an aspect of the disclosure, a curtain side airbag apparatus includes an airbag and an inflator. The airbag is stored in a housing adjacent to a side structure of a vehicle. The airbag includes a main body and an additional cushion portion. The housing includes an opening flange. The inflator provides a gas into the airbag for inflating the airbag. Upon deployment of the airbag, the main body of the airbag projects substantially downwardly from the housing and the additional cushion portion of the airbag projects substantially upwardly into the opening flange of the housing.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
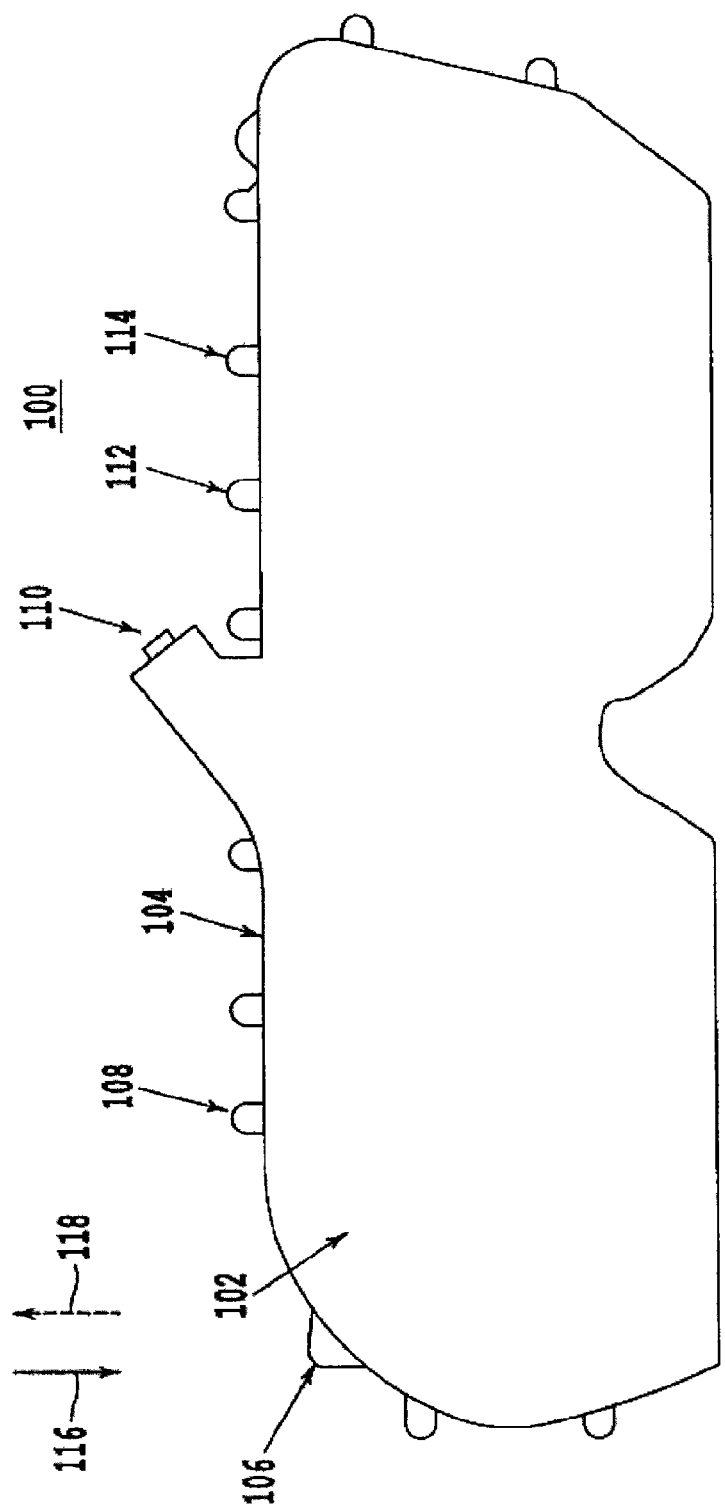
FIG. 1 is a schematic side view showing an uninflated state of an illustrative side curtain airbag apparatus when no overlap is added to a main body of a side curtain airbag in accordance with an exemplary aspect of the present disclosure.

Referring now to the drawings, wherein like reference numerals designate identical or corresponding parts throughout the several views. Further, as used herein, the words "a," "an" and the like generally carry a meaning of "one or more," unless stated otherwise.

FIG. 1 is a schematic side view showing an uninflated state of an illustrative side curtain airbag apparatus 100 when no overlap is added to a main body 102 of a side curtain airbag 104 in accordance with an exemplary aspect of the present disclosure. The side curtain airbag apparatus 100 may be installed in a mobile machine such as an automotive vehicle (hereinafter "vehicle"). The side curtain airbag apparatus 100 is typically arranged in the peripheral edge of a door or a window on the interior side of the vehicle. An outlet of an inflator is coupled to the side curtain airbag 104 at a gas inlet 110 of the side curtain airbag 104. In an event of a vehicle emergency, for example when the vehicle is subjected to an impact load due to a side collision with another vehicle or a rollover, the side curtain airbag apparatus 100 quickly deploys the side curtain airbag 104 in response to the impact load to protect one or more occupants in the vehicle. According to an exemplary embodiment, the inflator generates and ejects high-pressure inflation gas such as nitrogen gas into the inflatable side curtain airbag 104 in response to an impact load to deploy the side curtain airbag 104 in the vehicle.

In an undeployed state, the side curtain airbag 104 is stored in a housing, which is adjacent to a side structure of the vehicle. The housing or part of the housing may be made of sheet metal. The side curtain airbag 104 may be stored in a rolled or folded state. Upon deployment, the side curtain airbag 104 typically extends along the side structure of the vehicle and projects substantially downwardly from the housing. The side curtain airbag 104 is fixedly attached to a vehicle body via multiple attachments 106, 108, 112, 114. Upward and downward directions correspond to a vertical direction of the vehicle. As shown in FIG. 1, a solid-line arrow 116 represents an downward direction while a dotted-line arrow 118 represents an upward direction.

The vehicle safety is regulated in each country. For example, in the US, the manufactures of the motor vehicle are required to conform and certify compliance with Federal Motor Vehicle Safety Standards (hereinafter "FMVSS") and Regulations. In particular, the side curtain airbag devices are required to meet the test requirements specified in FMVSS 226.

Figure 2:
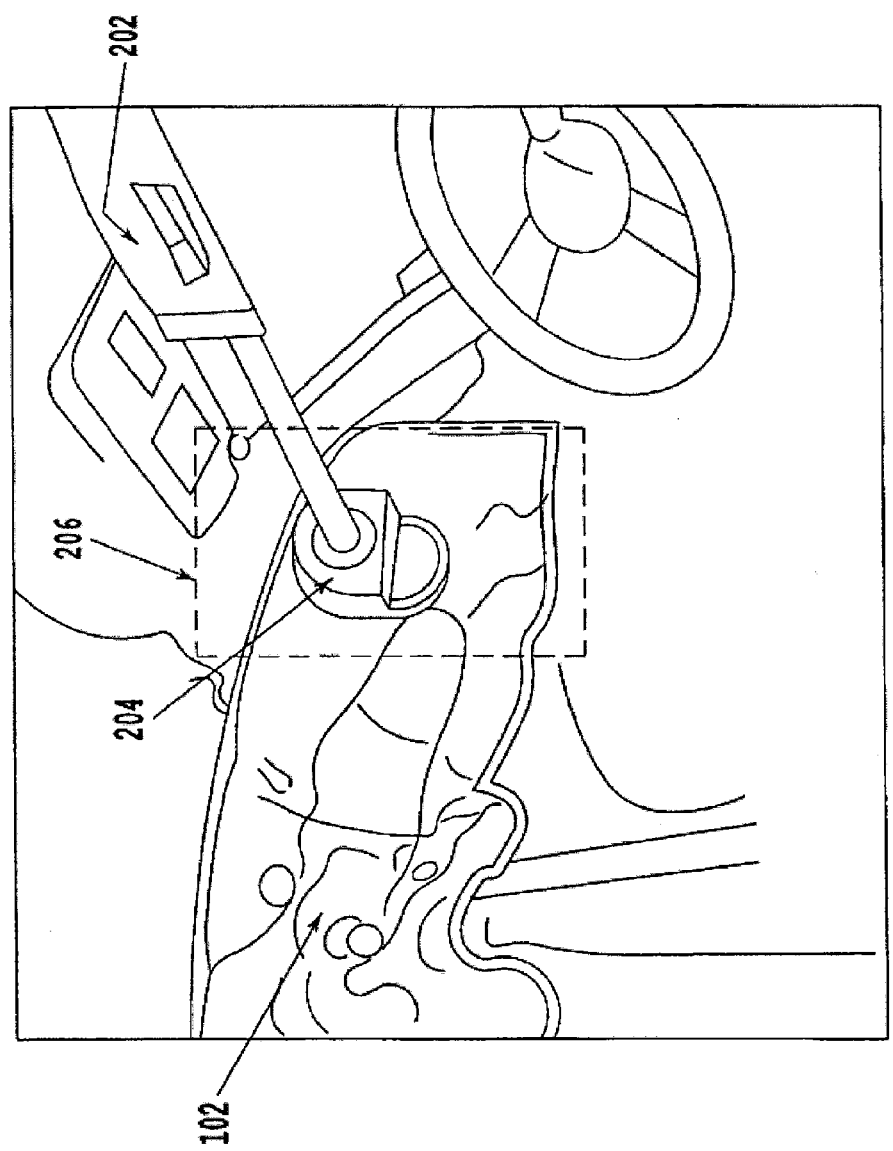
FIG. 2 is a schematic view showing a vehicle interior during an airbag performance test in accordance with an exemplary aspect of the present disclosure.

FIG. 2 is a schematic view showing a vehicle interior during an airbag performance test in accordance with an exemplary aspect of the present disclosure. The performance test shown in FIG. 2 is conducted when the side curtain airbag 104 is deployed and an impactor 204 of a test device 202 representing the head of an occupant is subsequently projectiled to the side curtain airbag 104. A boxed area 206 with dotted lines indicates an area adjacent to the cushion portion where the impactor 204 is projectiled. This test simulates an impact between an occupant's head and the cushion of the side curtain airbag that may occur during a vehicle crash or rollover. The test device 202 used for the performance test may be a pneumatic type device. In particular, FIG. 2 shows a moment when the impactor 204 is projectiled to the cushion of the side curtain airbag on the driver's seat side.

During the above-described performance test, it is monitored how well the side curtain airbag 104 retains the occupant's head in place during the impact. Further, the requirement of the performance test may define allowable movement of the occupant's head during the impact.

Figure 3:
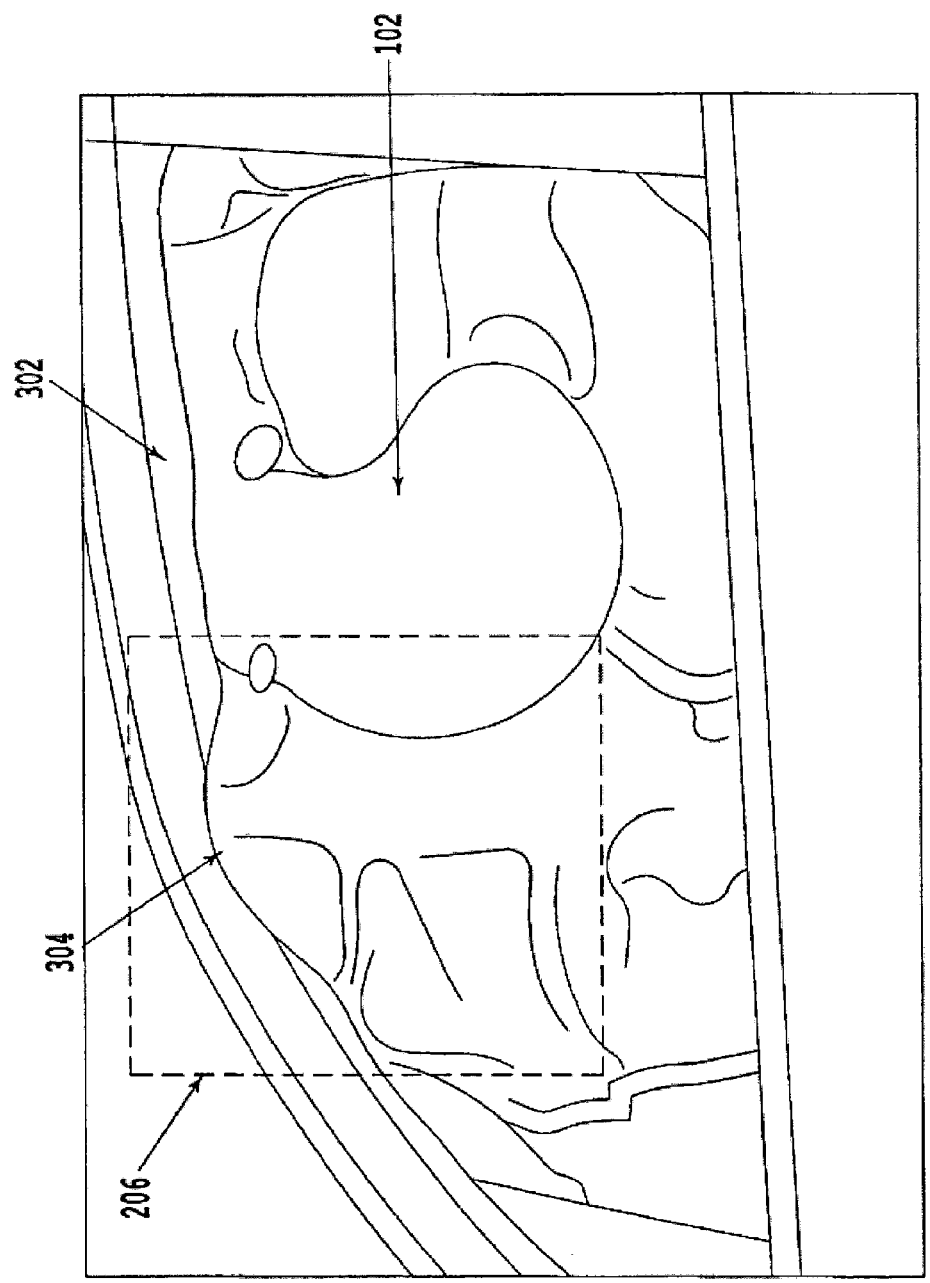
FIG. 3 is a schematic side view showing an impacted state of the side curtain airbag from outside a vehicle during the airbag performance test when no overlap is added to the main body of the side curtain airbag in accordance with an exemplary aspect of the present disclosure.

FIG. 3 is a schematic side view showing an impacted state of the side curtain airbag 104 from outside the vehicle during the airbag performance test when no overlap is added to the main body 102 of the side curtain airbag 104 in accordance with an exemplary aspect of the present disclosure. FIG. 3 shows the movement of the side curtain airbag 104, which is monitored from outside of the vehicle when the impactor 204 is applied (impacted) to the side curtain airbag 104. The boxed area 206 with dotted lines indicates an area adjacent to the cushion portion where the impactor 204 is projectiled, i.e. the same area 206 shown in FIG. 2 but seen from outside the vehicle. The movement of the side curtain airbag 104 during this impact is observed with respect to a window opening flange 302. As seen in FIG. 3, a portion 304 of the cushion of the side curtain airbag 104 slips past the window opening flange 302 during the impact. That is, the cushion of the side curtain airbag 104 buckles during the impact, which in turn allows the head of the occupant to go past the window opening flange 302.

According to an exemplary aspect of the present disclosure, the side curtain airbag apparatus 100 is configured such that it is effectively prevented that a portion of the airbag cushion slips or buckles during an impact between an occupant's head and the side curtain airbag 104 without adding an extra attachment to the vehicle body or other design changes on the vehicle body. Specifically, in an exemplary embodiment, an additional cushion is added to the main body 102 of the side curtain airbag 104.

Figure 4:
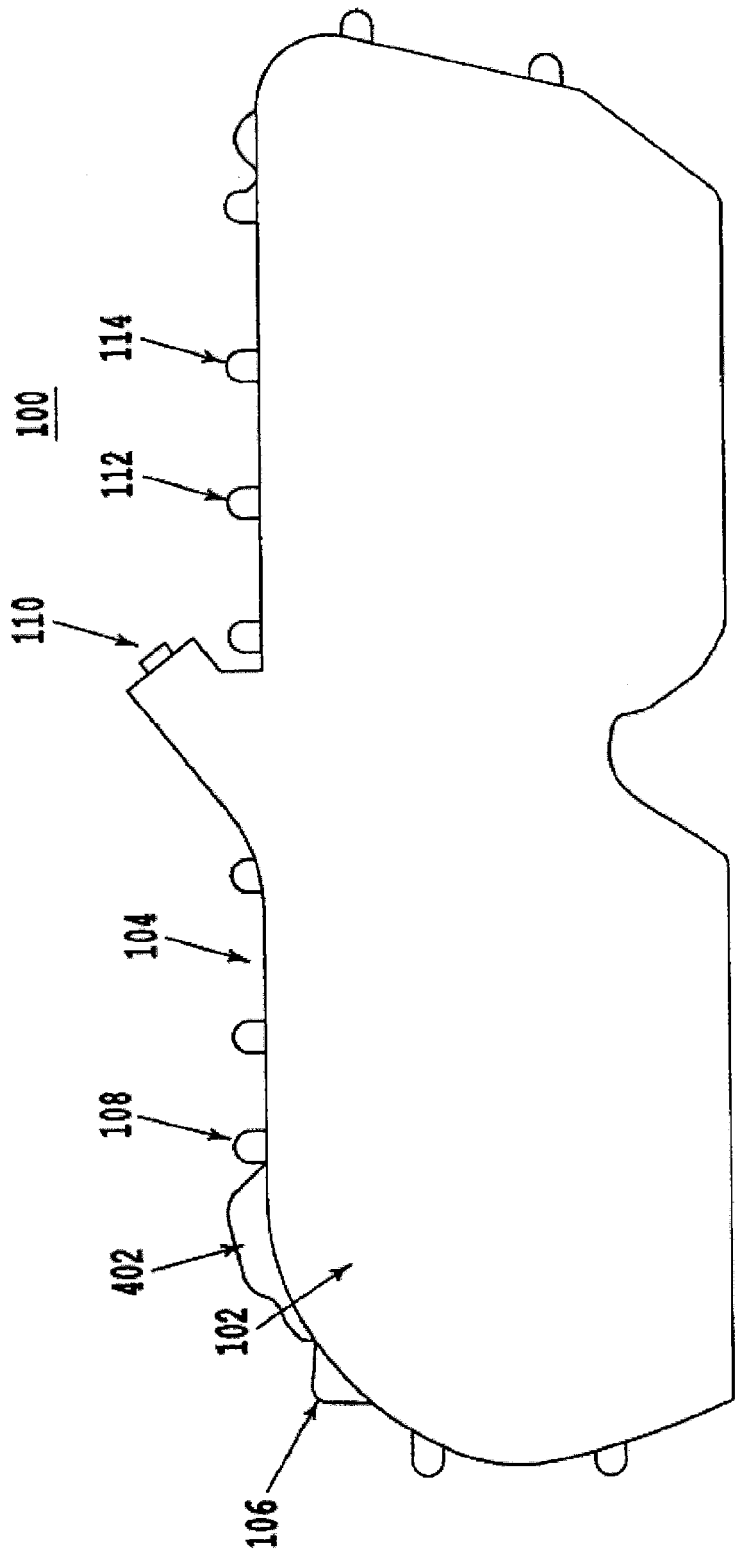
FIG. 4 is a schematic side view showing an uninflated state of the illustrative side curtain airbag apparatus when an overlap is added to the main body of the side curtain airbag in accordance with an exemplary aspect of the present disclosure.

FIG. 4 is a schematic side view showing an uninflated state of the illustrative side curtain airbag apparatus 100 when an overlap 402 is added to the main body 102 of the side curtain airbag 104 in accordance with an exemplary aspect of the present disclosure. The added overlap 402 is the additional cushion attached to the main body 102 of the side curtain airbag 104. The added overlap 402 may be sewn to the main body 102 of the side curtain airbag 104. In this non-limiting embodiment shown in FIG. 4, the added overlap 402 is attached between the attachment 106 and the attachment 108. However, the location where the added overlap 402 is attached is not limited to the location shown in FIG. 4. For example, an added overlap may be attached to a location between the attachment 112 and the attachment 114. Further, an added overlap may be attached to multiple locations on a needed basis.

Figure 5:
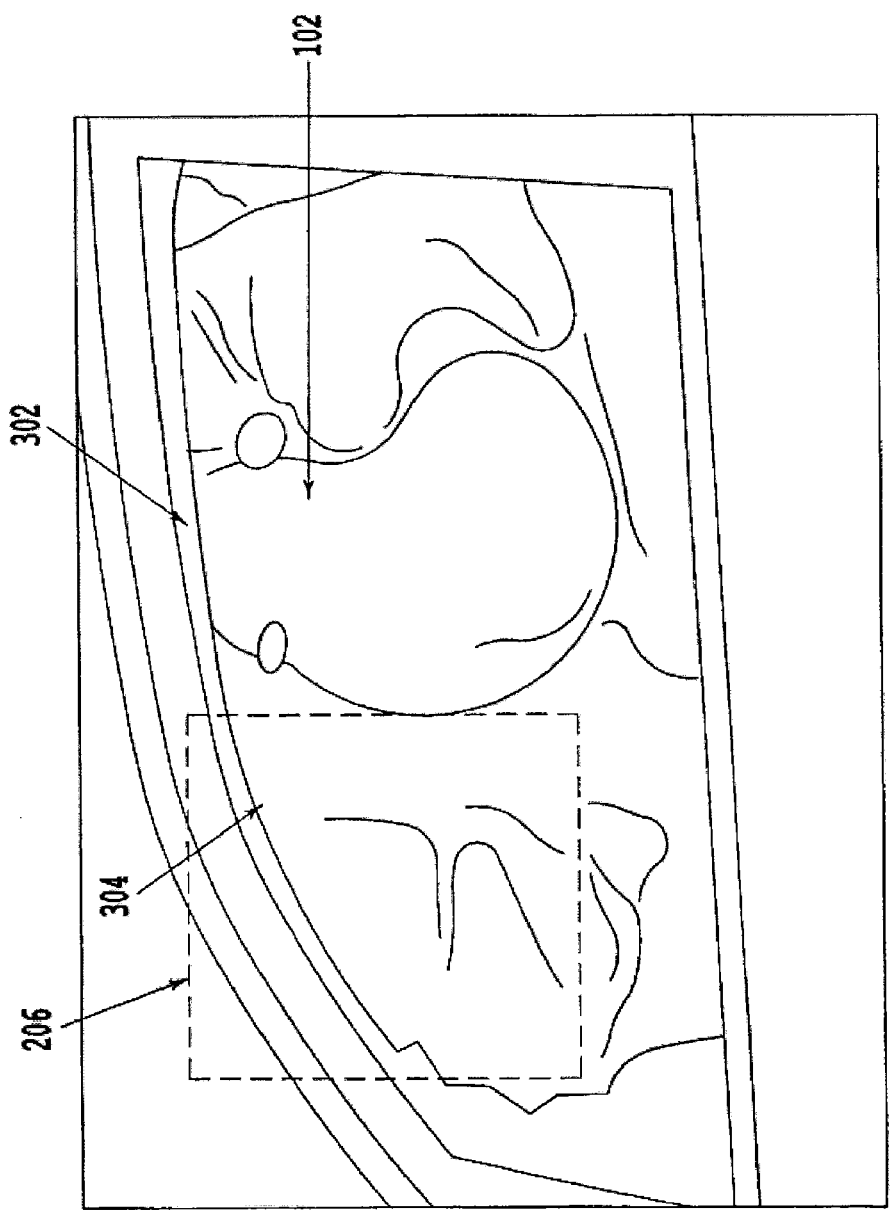
FIG. 5 is a schematic side view showing an impacted state of the side curtain airbag from outside the vehicle during the airbag performance test when an overlap is added to the main body of the side curtain airbag in accordance with an exemplary aspect of the present disclosure.

FIG. 5 is a schematic side view showing an impacted state of the side curtain airbag 104 from outside the vehicle during the airbag performance test when the overlap 402 is added to the main body 102 of the side curtain airbag 104 in accordance with an exemplary aspect of the present disclosure. FIG. 5 shows the movement of the side curtain airbag 104, which is monitored from outside of the vehicle when the impactor 204 is applied (impacted) to the side curtain airbag 104. The boxed area 206 with dotted lines indicates an area adjacent to the cushion portion where the impactor 204 is projectiled, i.e. the same area 206 shown in FIG. 2 but seen from outside the vehicle. The movement of the side curtain airbag 104 during this impact is observed with respect to the window opening flange 302. In contrast with what was observed in FIG. 3, there is no slipping of the cushion, during the impact, observed in an area 502 where slipping occurred when no overlap was attached. The cushion of the side curtain airbag 104 does not go outside the window opening flange 302. That is, buckling of the cushion of the side curtain airbag 104 during the impact was effectively prevented, thereby the head of the occupant is prevented from going past the window opening flange 302.

Figure 6A:
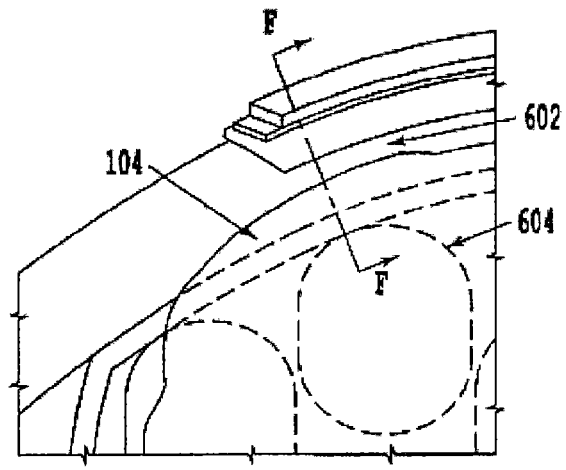
FIG. 6(a) is a schematic side view showing an inflated state of the side curtain airbag from outside the vehicle when no overlap is added to the main body of the side curtain airbag in accordance with an exemplary aspect of the present disclosure.

In reference to FIGS. 6(a), 6(b), 6(c) and 7(a), 7(b), 7(c), it will be explained in detail how this added overlap 402 works to prevent slipping or buckling of the cushion of the side curtain airbag 104. FIG. 6(a) is a schematic side view showing an inflated state of the side curtain airbag 104 from outside the vehicle when no overlap is added to the main body 102 of the side curtain airbag 104 in accordance with an exemplary aspect of the present disclosure. In an undeployed state, the side curtain airbag 104 is stored in a housing along a roof side portion 602. In response to an impact load during a vehicle crash or rollover, the side curtain airbag 104 is deployed to protect an occupant's head 604.

Figure 6B:
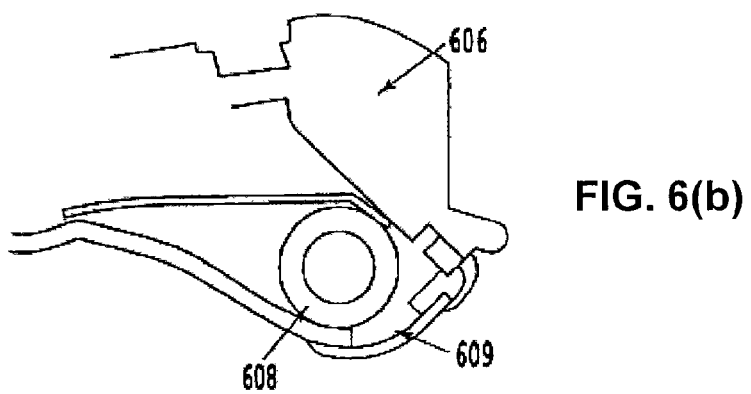
FIG. 6(b) is a cross sectional view taken along a line F-F in FIG. 6(a) showing an undeployed and rolled (assembled) state of the side curtain airbag when no overlap is added to the main body of the side curtain airbag in accordance with an exemplary aspect of the present disclosure.

FIG. 6(b) is a cross sectional view taken along a line F-F in FIG. 6(a) showing an undeployed and rolled (assembled) state of the side curtain airbag 104 when no overlap is added to the main body 102 of the side curtain airbag 104 in accordance with an exemplary aspect of the present disclosure. In an undeployed state, the side curtain airbag 104 may be stored in the housing in a rolled state 608. The housing may include an opening flange 606. The opening flange 606 may be made of sheet metal. In this non-limiting embodiment, the rolled side curtain airbag 104 is stored below the opening flange 606 of the housing. When the side curtain airbag 104 is inflated, the rolled side curtain airbag 104 pushes open an opening 609 and projects substantially downwardly to be deployed. However, the method for storing the side curtain airbag 104 in the housing in the present disclosure is not limited to the above-discussed method. For example, the side curtain airbag 104 may be stored in the housing in a folded state.

Figure 6C:
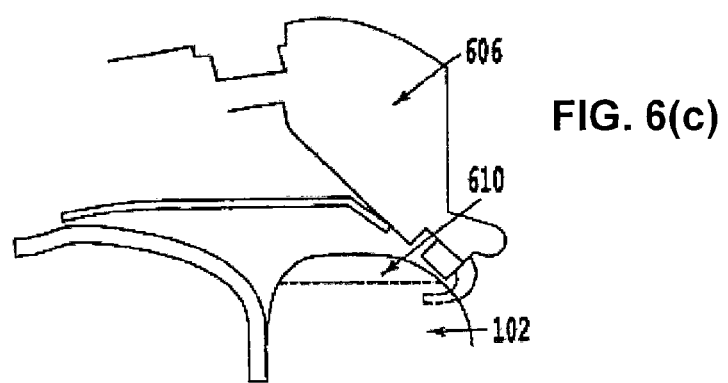
FIG. 6(c) is a cross sectional view taken along a line F-F in FIG. 6(a) showing a deployed state of the side curtain airbag when no overlap is added to the main body of the side curtain airbag in accordance with an exemplary aspect of the present disclosure.

FIG. 6(c) is a cross sectional view taken along a line F-F in FIG. 6(a) showing a deployed state of the side curtain airbag 104 when no overlap is added to the main body 102 of the side curtain airbag 104 in accordance with an exemplary aspect of the present disclosure. Upon deployment, the main body 102 of the side curtain airbag 104 projects substantially downwardly from the housing. In a deployed state as shown in FIG. 6(c), a top portion 610 (hatched portion) of the main body 102 of the side curtain airbag 104 overlaps with the opening flange 606 of the housing in a projection direction of the main body 102 of the side curtain airbag 104. However, this overlapping portion 610 (hatched portion) is small, for example 3.2 mm in the projection direction of the main body 102 in this case. Thus, when the head 604 of the occupant impacts the main body 102 of the deployed side curtain airbag 104, the top portion 610 of the main body 102 may slip (or escape) past the opening flange 606 of the housing during this impact. As a result, the cushion of the side curtain airbag 104 buckles during the impact, which in turn allows the head 604 of the occupant to go past the window opening flange 302. That is, the cushion of the side curtain airbag 104 does not maintain proper tension during the impact between the head 604 of the occupant and the main body 102 of the side curtain airbag 104, thereby failing to keep the head 604 of the occupant inside the window opening flange 302 during the impact.

According to an exemplary aspect of the present disclosure, this issue is resolved without adding an extra attachment to the vehicle body or other design changes on the vehicle body. Specifically, in an exemplary embodiment, an additional cushion is added to the main body 102 of the side curtain airbag 104.

Figure 7A:
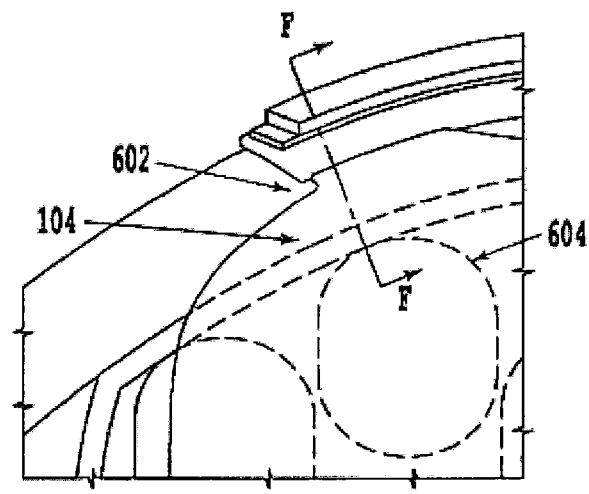
FIG. 7(a) is a schematic side view showing an inflated state of the side curtain airbag from outside the vehicle when an overlap is added to the main body of the side curtain airbag in accordance with an exemplary aspect of the present disclosure.

FIG. 7(a) is a schematic side view showing an inflated state of the side curtain airbag 104 from outside the vehicle when an overlap is added to the main body 102 of the side curtain airbag 104 in accordance with an exemplary aspect of the present disclosure. In an undeployed state, the side curtain airbag 104 is stored in the housing along the roof side portion 602. In response to an impact load during a vehicle crash or rollover, the side curtain airbag 104 is deployed to protect an occupant's head 604.

Figure 7B:
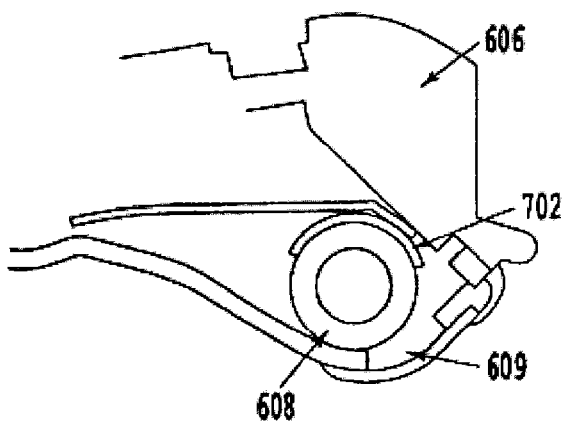
FIG. 7(b) is a cross sectional view taken along a line F-F in FIG. 7(a) showing an undeployed and rolled (assembled) state of the side curtain airbag when an overlap is added to the main body of the side curtain airbag in accordance with an exemplary aspect of the present disclosure.

FIG. 7(b) is a cross sectional view taken along a line F-F in FIG. 7(a) showing an undeployed and rolled (assembled) state of the side curtain airbag 104 when an overlap 702 is added to the main body 102 of the side curtain airbag 104 in accordance with an exemplary aspect of the present disclosure. In an exemplary embodiment, the side curtain airbag 104 is stored in the housing in a rolled state 608 when undeployed. In this non-limiting embodiment, the rolled side curtain airbag 104 is stored below the opening flange 606 of the housing. In an undeployed state, the added overlap 702 may sit on the rolled side curtain airbag 104, as shown in FIG. 7(b). When the side curtain airbag 104 is inflated, the rolled side curtain airbag 104 pushes open an opening 609 and projects substantially downwardly to be deployed.

Figure 7C:
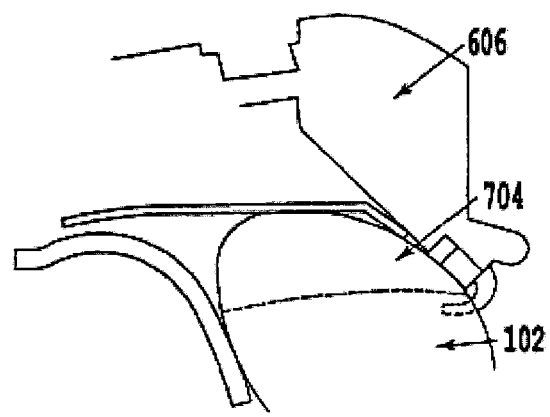
FIG. 7(c) is a cross sectional view taken along a line F-F in FIG. 7(a) showing a deployed state of the side curtain airbag when an overlap is added to the main body of the side curtain airbag in accordance with an exemplary aspect of the present disclosure.

FIG. 7(c) is a cross sectional view taken along a line F-F in FIG. 7(a) showing a deployed state of the side curtain airbag 104 when the overlap 702 is added to the main body 102 of the side curtain airbag 104 in accordance with an exemplary aspect of the present disclosure. Upon deployment, the main body 102 of the side curtain airbag 104 projects substantially downwardly from the housing. In a deployed state as shown in FIG. 6(c), a top portion 704 (hatched portion) of the main body 102 of the side curtain airbag 104 overlaps with the opening flange 606 of the housing in the projection direction of the main body 102 of the side curtain airbag 104. In contrast with the amount of overlapping portion 610 in an inflated state shown in FIG. 6(c) when no overlap is added to the main body 102 of the side curtain airbag 104, the amount of the overlapping portion 704 significantly increases in an inflated state when the overlap 702 is added to the main body 102, as illustrated in FIG. 7(c). For example, the length of the overlapping portion 704 in the projection direction of the main body 102 of the side curtain airbag 104 is 26.6 mm when the overlap 702 is added to the main body 102 of the side curtain airbag 104.

In a non-limiting embodiment, the overlapping portion 704 is disposed below the opening flange 606 of the housing and is in contact with the bottom of the opening flange 606 of the housing in an inflated (or deployed) state. When the head 604 of the occupant impacts the main body 102 of the deployed side curtain airbag 104, the top portion (overlapping portion) 704 extends further above the opening flange 606 and is compressed against the bottom of the opening flange 606 of the housing, such that the top portion 704 of the main body 102 is prevented from slipping (or escaping) past the opening flange 606 of the housing during the impact. The inflation gas inside the side curtain airbag 104 is compressed during the impact. As a result, the cushion of the side curtain airbag 104 is prevented from buckling during the impact, which in turn prevents the head 604 of the occupant to go past the window opening flange 302. That is, the cushion of the side curtain airbag 104 maintains proper tension during the impact between the head 604 of the occupant and the main body 102 of the side curtain airbag 104, thereby keeping the head 604 of the occupant inside the window opening flange 302 during the impact.

In an exemplary embodiment, the overlapping portion 704 of the main body 102 may fold and rotate down during the impact between the head 604 of the occupant and the main body 102 of the side curtain airbag 104. This folding or/an rotating down of the overlapping portion 704 of the main body 102 occurs due to compression of the inflation gas during the impact. As a result, the overlapping portion 704 of the main body 102 does not slip past the opening flange 606 of the housing, and stays inside the opening flange 606 during the impact. Consequently, by adding the overlap 702 to the main body 102 of the side curtain airbag 104, slipping or buckling of the cushion of the side curtain airbag 104 is effectively prevented during an impact between the head 604 of the occupant and the main body 102 of the side curtain airbag 104, as illustrated in FIG. 5 using a schematic view from outside the vehicle during the airbag performance test.

In an undeployed state, the side curtain airbag 104 may be stored in a rolled or folded manner. Further, the side curtain airbag 104 may be wrapped by a wrapping material, which prevents a rolled or folded airbag from returning to its unrolled or unfolded state. During deployment of the side curtain airbag 104, the main body 102 projects substantially downwardly from the housing. However, the overlapping portion 704 of the main body 102 projects substantially upwardly into the housing.

In an exemplary embodiment, upon deployment, the added overlap 702 projects upwardly into the opening flange 606 of the housing, as shown in FIG. 7(c). This upward projection of the added overlap 702 can be achieved in several ways. For example, referring to FIG. 7(b), the side curtain airbag 104 is stored in a rolled state 608 when undeployed. The overlap 702 added to the main body 102 of the side curtain airbag 104 may be disposed on an outer periphery of the rolled-up airbag 104 facing the bottom of the opening flange 606 of the housing. Here, the added overlap 702 is neither wrapped all the way around the rolled-up airbag 104, nor tucked into the rolled-up airbag 104. Instead, the added overlap 702 simply lies on the rolled-up airbag 104 facing the bottom of the opening flange 606 of the housing in an undeployed state. Thus, upon deployment, the added overlap 702 is directly opposed to the bottom of the opening flange 606 of the housing, and pushed up against the bottom of the opening flange 606 of the housing. That is, the added overlap 702 in an undeployed state shown in FIG. 7(*b*) becomes the overlapping portion 704 in a deployed state shown in FIG. 7(*c*).

In another exemplary embodiment, the side curtain airbag 104 may be stored in a folded state when undeployed. In this case, the overlap 702 added to the main body 102 of the side curtain airbag 104 may be disposed on an outer periphery of the folded-up airbag 104 such that upon deployment, the added overlap 702 is pushed up against the bottom of the opening flange 606 of the housing. However, the method for disposing the added overlap 702 relative to, for example, the rolled-up or folded-up side curtain airbag 104 in an updeployed state according to an exemplary aspect of the present disclosure is not limited to the above-described methods. As long as the overlap 702 added to the main body 102 of the side curtain airbag 104, upon deployment, projects substantially upwardly into the housing and stays within the housing during an impact between the head 604 of the occupant and the main body 102 of the side curtain airbag 104, methods for disposing the added overlap 702 relative to the main body 102 in an updeployed state can be varied within the scope of the present disclosure.

According to an exemplary aspect of the present disclosure, the overlap 702 is added only in the needed areas of the side curtain airbag 104 that are likely to slip or buckle during an impact between the body of the occupant and the side curtain airbag 104. Accordingly, the overlap 702 can be added without affecting the overall packaging size and there is no need to add extra attachments to the vehicle body.

Thus far, application of the added overlap 702 according to an exemplary aspect of the present disclosure was described using a side curtain airbag system. However, application of the added overlap 702 according to an exemplary aspect of the present disclosure is not limited to a side curtain airbag system. For example, the added overlap 702 described in the present disclosure can be applied to other types of airbag systems including various other side-impact airbags.

The foregoing disclosure describes merely illustrative embodiments of the present invention. As will be understood by those skilled in the art, the present invention may be embodied in other specific forms without departing from the spirit or essential characteristics thereof. Accordingly, the disclosure is intended to be illustrative of the present invention, but not limiting of the scope of the invention, as well as the following claims. The disclosure and any discernible variants of the teachings herein define, at least in part, the scope of the claim terminology, such that no inventive subject matter is dedicated to the public.

The invention claimed is:

1. A curtain side airbag apparatus for a vehicle including a window opening flange, comprising:

an airbag stored in a housing adjacent to a side structure of the vehicle and is fixedly attached to the vehicle via a plurality of attachments, the airbag including a main body and an additional cushion portion, the additional cushion portion attached to the main body between two adjacent attachments of the plurality of attachments and the housing including an opening flange; and an inflator that provides a gas into the airbag for inflating the airbag, wherein upon deployment of the airbag, the main body of the airbag projects substantially downwardly from the housing and the additional cushion portion of the airbag projects substantially upwardly into the opening flange of the housing.

2. The curtain side airbag apparatus according to claim 1, wherein upon deployment of the airbag, the additional cushion portion of the airbag is disposed below the opening flange of the housing and overlaps with the opening flange of the housing in a projection direction of the additional cushion portion of the airbag.

3. The curtain side airbag apparatus according to claim 2, wherein when the airbag is impacted by an object in the vehicle, the additional cushion portion of the airbag is compressed against the opening flange of the housing such that the additional cushion portion of the airbag does not escape past the window opening flange.

4. The curtain side airbag apparatus according to claim 3, wherein the object is a head of an occupant of the vehicle.

5. The curtain side airbag apparatus according to claim 3, wherein when the airbag is impacted by the object, the gas inside the airbag is compressed such that the airbag is prevented from buckling.

6. The curtain side airbag apparatus according to claim 3, wherein when the airbag is impacted by the external object, the additional cushion portion of the airbag folds and rotates down.

7. The curtain side airbag apparatus according to claim 3, wherein upon deployment of the airbag, the additional cushion portion of the airbag is disposed only in an area where a buckling of the airbag occurs during an impact between the object and the airbag.

8. The curtain side airbag apparatus according to claim 1, wherein the airbag is stored in a rolled state when undeployed.

9. The curtain side airbag apparatus according to claim 1, wherein the airbag is stored in a folded state when undeployed.

10. The curtain side airbag apparatus according to claim 1, wherein the airbag is stored in a wrapped or unwrapped state when undeployed.

11. The curtain side airbag apparatus according to claim 8, wherein the additional cushion portion of the airbag is disposed on a periphery of the rolled airbag facing the opening flange of the housing when the airbag is undeployed.

12. The curtain side airbag apparatus according to claim 9, wherein the additional cushion portion of the airbag is disposed on a periphery of the folded airbag facing the opening flange of the housing when the airbag is undeployed.

* * * * *